Figure 1:
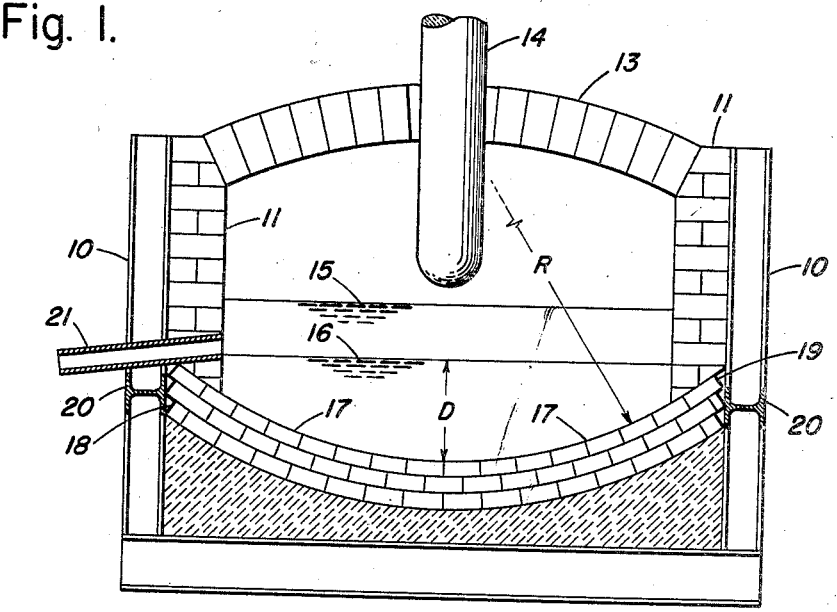

Feb. 26, 1963   F. C. SENIOR   3,079,450
FURNACE REFRACTORY STRUCTURES
Filed May 12, 1959

INVENTOR.
Frank C. Senior
BY Charles J. Elderkin
ATTORNEY

United States Patent Office 3,079,450
Patented Feb. 26, 1963

3,079,450
FURNACE REFRACTORY STRUCTURES
Frank C. Senior, Pittsburgh, Pa., assignor to Strategic Materials Corporation, New York, N.Y., a corporation of New York
Filed May 12, 1959, Ser. No. 812,639
3 Claims. (Cl. 13—9)

This invention relates to improvements in the construction of refractory furnace linings and, in particular, refractory hearths or crucible bottoms for electric furnaces as commonly employed in steel making, ferroalloy production, and a host of other metallurgical operations. Specifically, the invention involves the provision of a unique refractory hearth structure which combines the beneficial advantages of inverted sprung or circular arch brick construction with the very desirable low-level tapping characteristics obtained with the conventional rammed hearths and flat-laid brick hearths commonly employed by industry.

In general, the principal requirements of any furnace hearth include: (A) relatively low cost per ton of metal produced, as distinguished from initial cost; (B) ease of installation, maintenance and repair; (C) maximum durability to minimize between-heat repairs; and (D) chemical inertness to metallic constituents, and relatively high resistance to absorption of alloys that might contaminate succeeding heats. Coupled with the foregoing requirements are a series of factors which are peculiar to electric furnaces and generally complicate the construction of bottom hearths that might otherwise qualify in terms of the stated criteria. For example, (1) the electric furnace hearth must be amenable for use with a wide variety of different metallurgical charges, (2) it must be resistant to the practically unlimited source of temperature from the electric arcs, and (3) it must be relatively resistant to damage from additive agents including, for example, the unstable dicalcium silicate slags which tend to decrepitate on cooling and damage the hearth during "down" periods of the furnace.

In accordance with current commercial practices, considerable variation exists in the methods employed for installing electric furnace hearths. Thus, many installations pursue the technique of gradually building up a crucible bottom by sintering in place successive layers of dead-burned grain magnesite or clinkered dolomite fluxed with open-hearth slag or mill scale. Others employ modernized versions of the ramming technique to construct monolithic hearths through use of commercially prepared ramming refractories such as chrome plastics, or grain-sized aggregates of 65 to 80 percent MgO materials compounded with bonding chemicals that will air-set after being tempered with water and dried, or equivalent ramming agents utilizing carbonaceous mixes as the principal refractory ingredient. Still other hearths are formed by using high-fired brick of magnesia, silica and the like, arranged in various combinations of substantially flat header, stretcher and soldier courses.

Significantly, the conventional rammed and flat-laid brick hearths exhibit a common serious disadvantage, namely, the pronounced and frequent tendency for sections of the surface refractory to float up from the hearth, requiring rather frequent and extensive repairs. In an effort to avoid this type of refractory failure, many installations have adopted various keying techniques to physically interlock the individual hearth bricks to each other. By far the most satisfactory construction of this type is that employing an inverted arch in which the bricks are interlocked against upward release by virtue of their arched configuration downwardly from a special skewback row provided a suitable distance up the sidewall of the furnace chamber. Alternatively, specially tapered or wedge-shaped arch brick are supplied by most refractory manufacturers to accommodate this type of construction. In general, in order to obtain the most satisfactory keying of the bricks against upward release through use of the inverted arch type hearth structure, extremely flat arches must be avoided, and the conventional circular arch is found to provide the most satisfactory results. Such an arch generally subtends an angle of approximately 60 degrees, which makes the radius of curvature equal to the span.

As will be readily appreciated, the curvature of such an arch, which is usually expressed in inches of rise per foot of span, can result in a substantially depressed or dished-out hearth when used in conjunction with large modern electric furnaces. Since it is not generally feasible to extend the tap hole for the furnace through any of the brick employed in the hearth arch, it is usually positioned about six or seven inches above the skewback row in order to stabilize the structure. This in turn necessitates the continual maintenance of an unwanted depth of residual metal within the furnace chamber, since it is impossible to tap the furnace of metal accumulated within the inverted arch. For most commercial installations, this residual metal assumes a depth of the order of from 20 to 36 inches at the peak point of the inverted arch or the center of the furnace.

The unique hearth structure of the present invention is adapted to preserve the very desirable keying feature of conventional inverted arch structures, while rendering the hearth gravity-tappable to a very low level of residual metal. The hearth structure of the invention further results in a permissible lowering of the furnace roof appreciably beyond that possible with conventional symmetrical inverted arch hearths, and, of course, reduces the weight of metal that must be supported by the bottom structure with attendant savings in constructional costs.

In essence, I accomplish the foregoing objectives by the expedient of shifting the relative position of the inverted arch such that one of the skewback rows defining the ends of the arch is lowered to a position only slightly above the normal zero level of metal contained in the crucible. The geometry of the arch is preserved, such that the opposite end of the arch is raised upwardly on the furnace sidewall. The resulting structure permits one to locate the tap hole at a point corresponding to the most desirable level for residual metal left in the crucible after tapping, namely, from three to six inches above the lowermost level of the hearth. Essentially, one obtains a stationary structure in which the hearth resembles that of a tilting furnace in its tapping or pouring position.

Figure 2:
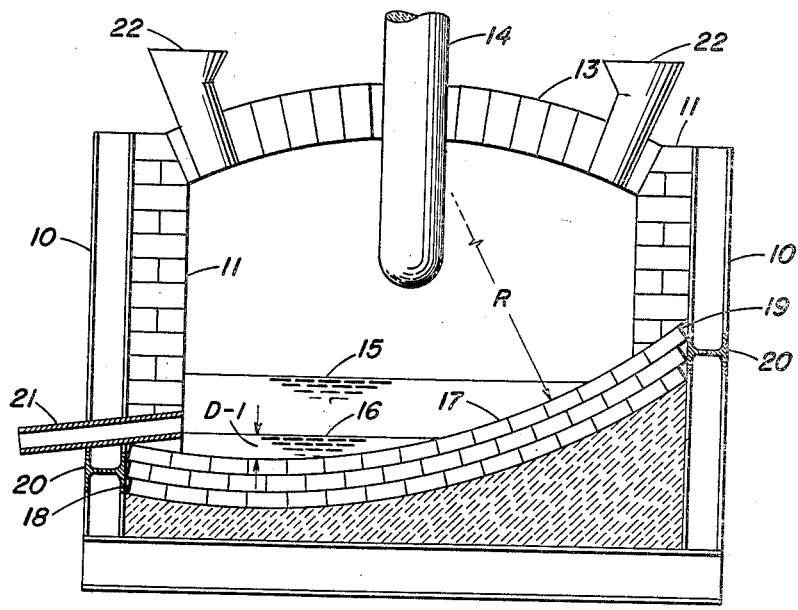

It is believed that my invention may be best understood by reference to the following detailed description of a specific embodiment of the same taken in conjunction with the accompanying drawing, wherein:

FIG. 1 is a vertical cross-sectional view of an electric furnace illustrating a conventional inverted arch type hearth structure; and FIG. 2 is a similar vertical cross-sectional view of an electric furnace incorporating the novel hearth structure of the present invention.

For purposes of comparison, a conventional inverted arch type hearth structure has been illustrated in cross-section in FIG. 1. The sections in both figures may be viewed as representing furnace chambers of either round or rectangular configuration, since the unique hearth structure of my invention is equally applicable to both types of furnaces.

With reference to FIG. 1, there is depicted a conventional furnace chamber consisting of the metallic outer shell 10 lined with refractory side-walls 11 of any suitable insulating medium, and enclosed by means of a removable refractory cover 13 which is preferably formed as a self-supporting conventional upright circular arch. The cover 13 is provided with conventional access holes for insertion of the furnace electrodes 14; one only being shown in the drawing, and suitable holes for charging, above which conventional hoppers 22 may be mounted. The slag and metal levels within the crucible section of the furnace are depicted by reference numerals 15 and 16, respectively. The inverted arch hearth section of the furnace is formed of a plurality of individual refractory bricks 17 terminating against the arch skewbacks 18 and 19 on opposite sides of the furnace. Conventional buckstays 20 are mounted within the refractory side walls of the furnace for supporting the suspended arch. The metal tap hole, indicated by reference numeral 21 in the drawing, is located through the side wall refractory at a point removed approximately six or seven inches above the arch skewback row.

As may be readily seen by reference to FIG. 1, the required location of metal tap hole 21 with respect to the lowermost portion of the inverted arch hearth is such that a depth of residual metal "D" must always be carried on the hearth. In actual commercial practice, this depth is usually of the order of from 20 to 36 inches, and amounts to several tons of weight constantly carried by the arch structure. In addition, the presence of this residual metal bath necessitates that a higher furnace chamber be employed to maintain the roof refractories relatively free of the influence of heat radiated from the arc zones, which will naturally be positioned relatively high in the furnace chamber due to elevation of the slag bath caused by the bottom metal.

In FIG. 2 of the drawing, wherein like reference numerals have been applied to equivalent elements of the overall furnace unit, there is illustrated the unique hearth structure of my invention, wherein the same desirable large hearth radius "R" is maintained while effectively lowering the hearth tap level by the expedient of elevating the skewback 19 opposite the metal tap hole 21 upwards on the furnace side wall. More precisely, the skewback 18 on the sidewall carrying the tapping hole is lowered to a nearly horizontal position to permit corresponding lowering of the tap hole 21. In this manner, the inverted arch is simply shifted without altering its geometry, such that the bottommost portion of the hearth is actually defined by a side segment of the circular arch.

The resulting structure permits tapping of the metal level 16 to the residual bath depth "D-1" which can be readily adjusted to from three to six inches in accordance with preferred smelting practices. Since the electrodes and their arc zones will be carried lower within the furnace crucible, the height of the furnace can be reduced appreciably. In addition, the static load on the inverted arch hearth is materially reduced with further savings in construction costs, and longer life for the hearth.

Having thus described the subject matter of my invention, what it is desired to secure by Letters Patent is:

1. A furnace hearth structure for use in a stationary furnace that comprises an inverted circular arch formed of a plurality of individual refractory units and having a refractory skewback terminating one end of said arch positioned at an elevated height on the furnace wall with the refractory skewback terminating the opposite end of said arch being positioned slightly above the lowermost level of said hearth.

2. A stationary electric furnace hearth structure that comprises an inverted circular arch formed of a plurality of individual refractory units positioned in keyed contiguous relationship around the periphery of said arch, a refractory skewback terminating one end of said arch and positioned at an elevated height on the furnace wall, and a refractory skewback terminating the opposite end of said arch positioned slightly above the lowermost level of said hearth.

3. An arc electric furnace for smelting metallurgical charge material that comprises, a furnace housing consisting of a bottom hearth, substantially vertical side walls extending upwardly from said bottom hearth and defining a reaction chamber adapted to retain molten slag and molten metal produced during operation of the furnace, a top cover overlying the reaction chamber, means provided in said top cover for permitting passage therethrough and variable vertical positioning with respect to the surface of molten slag contained in the reaction chamber of at least one arc electrode, hopper means provided in said top cover for supplying raw charge material to the reaction chamber, and a metal tap hole positioned in said vertical side walls slightly above the lowermost level of said bottom hearth, said bottom hearth comprising an inverted arch formed of a plurality of individual refractory units positioned in keyed contiguous relationship around the periphery of said arch and having a refractory skewback terminating one end of said arch positioned at an elevated height on said vertical side walls with a similar refractory skewback terminating the opposite end of said arch being positioned slightly below said tap hole.

References Cited in the file of this patent

UNITED STATES PATENTS

| 601,366 | Wilson et al. | Mar. 29, 1898 |
| 1,039,732 | Gronwall et al. | Oct. 1, 1912 |
| 1,069,601 | Churchward | Aug. 5, 1913 |
| 1,242,833 | Mathers | Oct. 9, 1917 |
| 1,277,899 | Freeman | Sept. 3, 1918 |
| 1,304,350 | Moore | May 20, 1919 |
| 1,338,881 | Stock | May 4, 1920 |
| 2,406,147 | Hopkins | Aug. 20, 1946 |

FOREIGN PATENTS

| 6,837 | France | Jan. 17, 1907 |
| | (Addition to No. 359,042) | |
| 81,173 | Austria | Aug. 25, 1920 |